United States Patent [19]

Nehl

[11] Patent Number: 4,771,887

[45] Date of Patent: Sep. 20, 1988

[54] STORAGE CONTAINER FOR MAGNETIC TAPE CASSETTES

[75] Inventor: Wolfgang Nehl, Waldachtal/Tumlingen, Fed. Rep. of Germany

[73] Assignee: fischerwerke Artur Fischer GmbH & Co. KG, Waldachtal/Tumlingen, Fed. Rep. of Germany

[21] Appl. No.: 73,964

[22] Filed: Jul. 15, 1987

[30] Foreign Application Priority Data

Jul. 15, 1986 [DE] Fed. Rep. of Germany ... 8818905[U]

[51] Int. Cl.4 .......................................... B65D 85/672
[52] U.S. Cl. .................................. 206/387; 206/817; 206/804; 312/319
[58] Field of Search ............... 206/387, 316, 817, 804; 312/319

[56] References Cited

U.S. PATENT DOCUMENTS 3,856,369 12/1974 Commiant ...................... 206/387 X
4,270,817 6/1981 McRae ............................ 206/387 X
4,678,245 7/1987 Fouassier ............................. 206/387

FOREIGN PATENT DOCUMENTS 2317184 2/1977 France ................................ 206/387
 614547 11/1979 Sweden ............................... 206/387
2021072 11/1979 United Kingdom ................ 206/387

Primary Examiner—William Price
Attorney, Agent, or Firm—Michael J. Striker

[57] ABSTRACT

Storage container for storing magnetic tape cassettes, disc cassettes or the like, is a box-shaped hollow container which receives the cassettes to be positioned in a row one next to another with a free space therebetween in an access area. The container has stop members at the front side thereof and springs positioned in the hollow box for pushing each cassette individually independently from the remaining cassettes against the stop members.

9 Claims, 3 Drawing Sheets

STORAGE CONTAINER FOR MAGNETIC TAPE CASSETTES

BACKGROUND OF THE INVENTION

The invention relates to a storage container for magnetic tape cassettes or the like.

Such storage containers are today primarily used for compact disc cassettes, magnetic tape cassettes and the like. They are used for storing such cassettes in cars or other vehicles, and also at home. Spring-mounted drawers or slide members, for example are used to hold these cassettes. If, however, cassettes are inserted with no auxiliary means in a storage container designed as a box, whether lying flat or standing upright, the user has great difficulty in removing a specific cassette from the box again as there is generally insufficient free space between the cassettes to provide access.

SUMMARY OF THE INVENTION

It is an object of the present invention to provide an improved container for storing magnetic tape cassettes.

It is another object of the invention to provide a storage container of the foregoing type which does not make use of drawers or similar structures for holding the cassettes and in which neither the cassettes nor the box would need to have special recesses, rear walls or the like for providing a gripping area.

These and other objects of the invention are attained by a storage container for storing magnetic tape cassettes, disc cassettes or the like, comprising a box-shaped hollow body which receives the cassettes to be positioned in a row one next to another with a free space therebetween in an access area; stop means at a front side of said hollow body and means positioned in said hollow body for pushing each cassette individually independently from the remaining cassettes against said stop means.

The container may further include at least one sloping wall inclined to a base of said hollow body, wherein two cassettes adjacent to a cassette to be removed from the container are pressed by a user against said pushing means and slide on said sloping wall towards a rear side of said hollow body thus providing a free access to the cassette to be removed.

The pushing means may be positioned at the rear side of said hollow body and adapted to push against a rear side of each cassette contained in the container.

The pushing means may include at least one spring.

Lateral guide rails may be provided in said body, which are spaced from each other to receive the cassettes so that they lie above one another.

Guide rails may be provided on said base, said guide rails being spaced from each other to receive the cassettes so that they stand upright in said body one next to another.

Because there is a free space between the cassettes, it is possible, on taking hold of a cassette, simultaneously to push back the neighboring cassettes with one's fingers so that the required cassette can be gripped without difficulty. As the devices which push the cassettes against front stop members there may be provided inclined faces and/or sloping supporting surfaces, whereby the cassettes slide automatically against the front stop means. It is preferable, however, to use in the region of the rear of the cassettes springs or other suitable advancing devices with the aid of which the cassettes are pushed against the stop means. As a cassette is removed, it is lifted up slightly so that it clears the front edge or bottom rail designed as a stop member. The neighboring cassettes then slide back into their original position again as the cassette is taken out.

The guide rails may be parallel to each other and inclined to said base so that each of them forms said sloping wall, said pushing means including a plurality of springs attached to said rear wall and spaced from each other.

The guide rails may be parallel to each other and each have a rear portion forming said sloping walls, said rushing means including a plurity of springs attached to said rear wall and spaced from each other.

The sloping wall may be formed by a rear portion at an internal side of said base.

The guide rails may have at front ends thereof projected edges which form said stop means.

The sloping wall may have a width which is equal to a depth of the container reduced by a length of the cassette.

The sloping wall is inclined to the base so that it rises in the direction towards the rear wall of the hollow box forming the container.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DETAILED DESCRIPTION OF THE PREFERRED EMBODIMENTS

Figure 1:
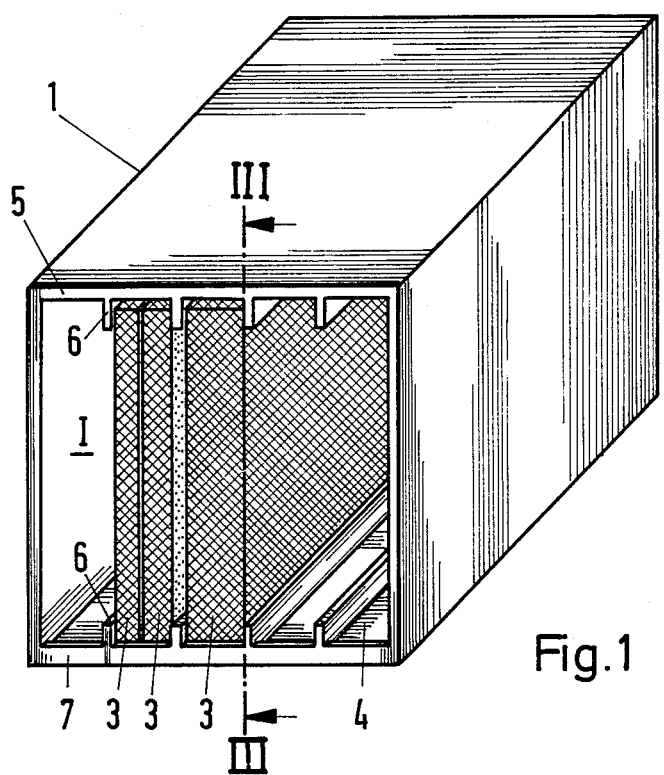
FIG. 1 is a perspective view of a storage container according to the invention, for example, for magnetic tape cassettes.
Figure 2:
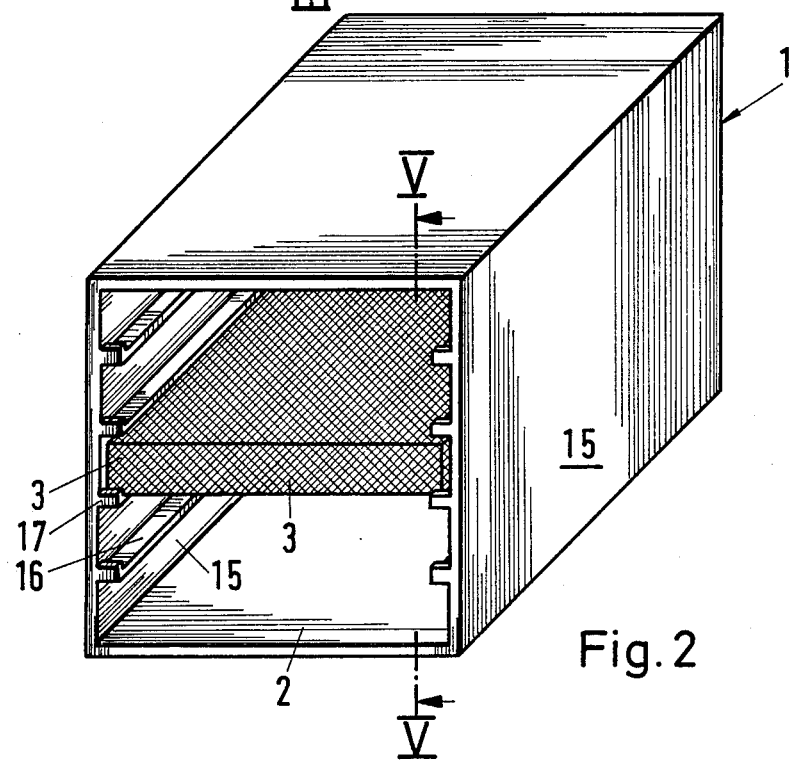
FIG. 2 is a perspective view of a further embodiment of a storage container.

Referring now to the drawings in detail, and firstly to FIGS. 1 and 2 thereof, it will be seen that a storage container particularly for storing magnetic tape cassettes according to the invention is formed as a cuboid box 1 open at a front side 2. This front side is, of course, to be closed with a lid which is not shown for the sake of clarity.

Cassettes 3 as shown in the embodiments of FIGS. 1 and 2, respectively, are placed in the box 1 either standing upright (FIG. 1) or lying flat (FIG. 2).

When cassettes 3 are positioned standing upright, holding bars 6 provided on the walls of the box project from a base 4 and from an opposing top 5 into the interior I of the box 1. Furthermore, in the base region there is further provided a projecting bottom rail 7 which runs transversely to the holding bars 6 and against which the cassettes 3 engage.

Figure 3:
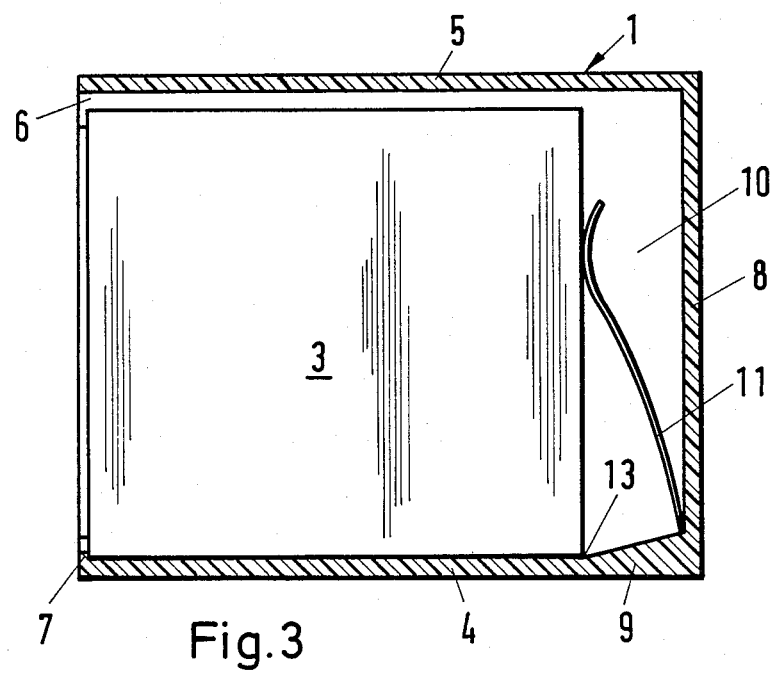
FIG. 3 is a cross-section through the storage container shown in FIG. 1, taken along the line III—III.
Figure 4:
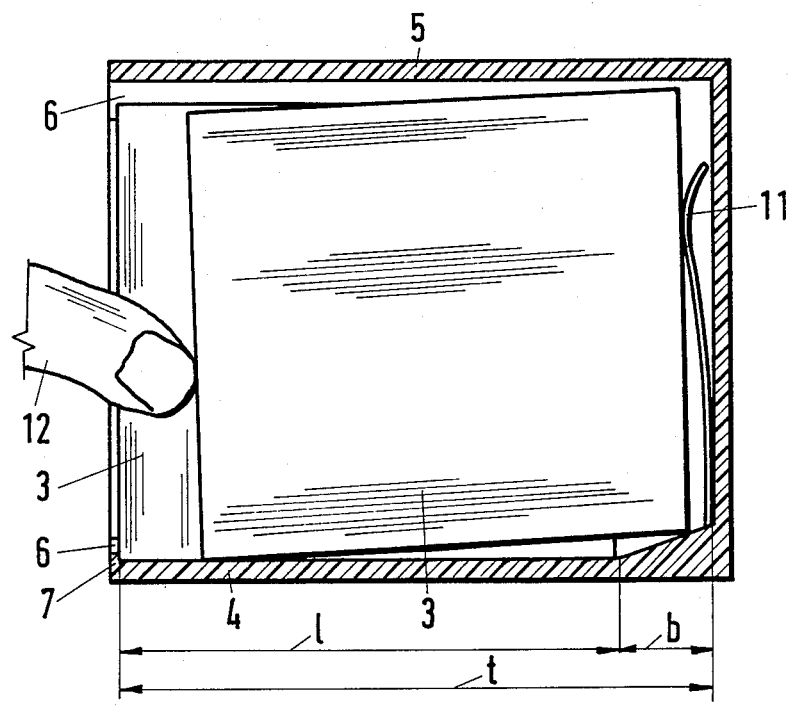
FIG. 4 is a cross-section corresponding to FIG. 3, but during the removal of a cassette

FIGS. 3 and 4 show that in a rear region of the base 4, there is a face 9 sloping upwards to the rear wall 8 of the box 1. The sloping face 9 has a width b which corresponds to the depth t of the box 1 reduced by the cassette length l. By this means, behind the cassettes 3 there is formed a space 10 in which a spring 11 is accommodated. This spring projects from the end of the sloping face 9 and abuts, at its free end, the rear surfaces of the cassettes 3.

In the state of rest, spring 11 presses the cassette 3 against the bottom rail 7, whereby the cassette is held in the box 1. If a cassette is now to be removed from the box accommodating cassettes 3 standing upright adjacent one another, the two cassettes standing next to the cassette which is to be removed, can be pressed backwards by the gripping fingers 12 as shown in FIG. 4, against the force of the spring 11 and the cassette to be removed is left exposed. As this cassette is withdrawn from box 1, the cassettes pressed backwards by the gripping fingers 12, upon withdrawal of the finger pressure, follow and slide as far as the botton rail 7 and then remain in the box 1 held by rail 7.

The embodimemt with the spring 11 is to be considered only one of preferred embodiments. In a simpler form of the invention, the provision of the sloping face 9 alone is sufficient, wherein this sloping face may also extend from the rear wall 8 of the box 1 up to the bottom rail 7 without forming an angle 13 (FIG.3) therebetween. The sloping face 9 is shaped in such a manner that the cassettes 3 slide forwards under their own weight, that is to say, slide downwards along the sloping face 9.

In the embodiment of the box 1 shown in FIG.2, the cassettes are arranged lying flat. The guide rails 16 molded on the opposite side walls 15 of the box 1 and having an edge 17 raised up toward the front side 2 serve to support the cassettes 3. The edge 17 is comparable with the bottom rail 7.

Figure 5:
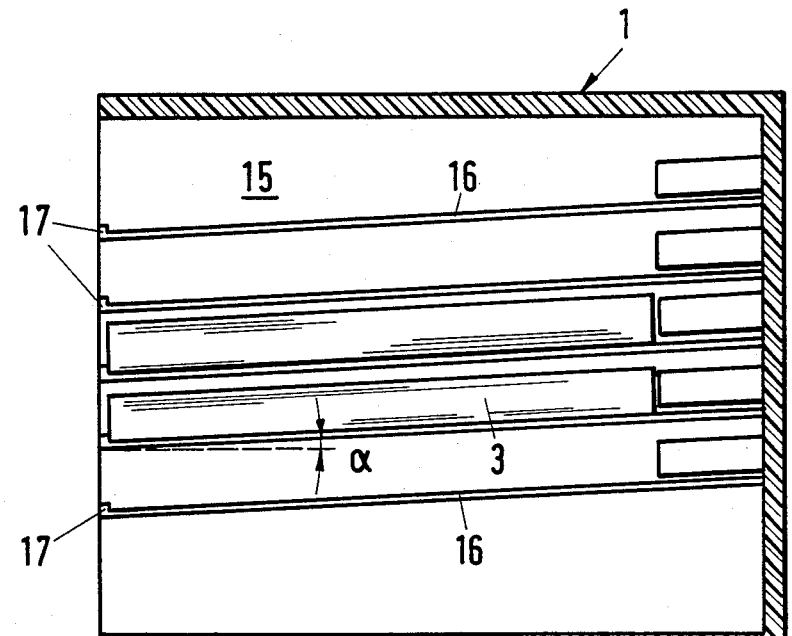
FIG. 5 is a cross-section through the storage container shown in FIG. 2, taken along the line V—V, but with two cassettes and five storage shelves.

As seen from FIG. 5, the guide rails 16 extend at an angle α to the base 4 of the box 1. As a result, a sloping slide face is again forced by each rail 16 for the cassettes 3 which abut against the edge 17 in the transport direction.

Figure 6:
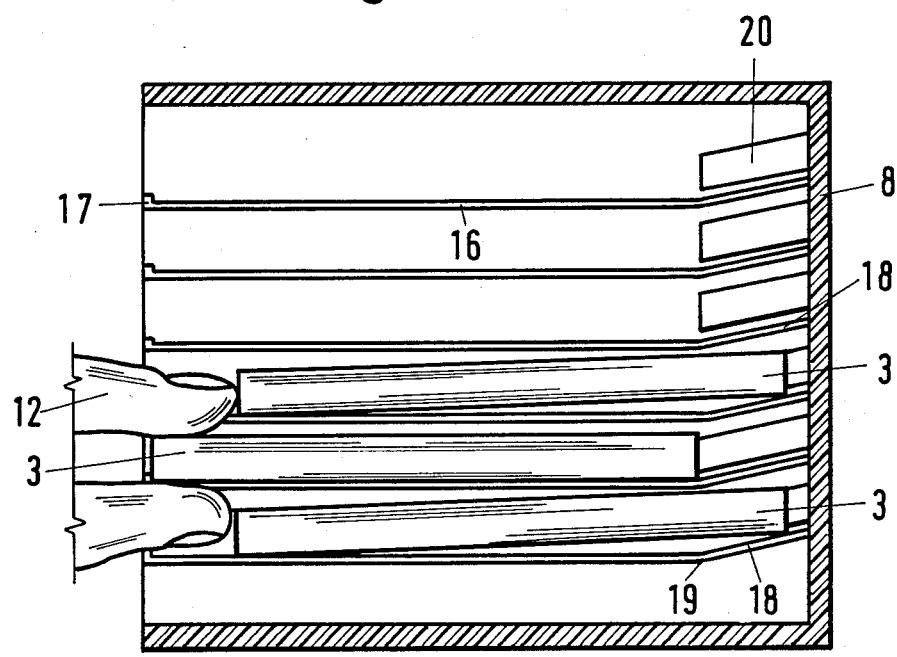
FIG. 6 is a cross-section similar to that of FIG. 5 but yet of another embodiment of the storage container of the invention.

As shown in FIG. 6, in a further embodiment of the storage container, the guide rails 16 are provided with a sloping face 18, which is comparable with the sloping face 9. The sloping face 18 of each guide rail 16 is a part of the guide rail. The major part of each rail 16 extends parallel to the base wall and the top wall of the box 1 whereas the rear portion of each rail 16 is inclined similarly to the sloping face 9 of the embodiment of FIGS. 3 and 4, relative to the major part of the guide rail 16.

Furthermore, springs 20 projecting from the rear wall 8 inwardly as shown diagrammatically, may be provided in the box of FIGS. 5 and 6, respectively. These springs hold the cassettes 3 against the edge 17. Springs 20 are attached to the rear wall of box 1 by any suitable means.

The procedure for removing a desired cassette in the embodiments of FIGS. 5 and 6 is similar to that described above. By putting one's fingers into the box 1, the two cassettes 3 which are adjacent to that one to be removed are pushed against the force of respective springs 20 which are assigned to them, towards the rear wall 8, so that the cassette to be removed is exposed. This cassette is raised slightly so that it is disengaged from the edge 17 and can be removed. As this cassette is withdrawn, the adjacent cassettes follow the fingers 12 until they reach their respective edges 17.

It will be understood that each of the elements described above, or two or more together, may also find a useful application in other types of storage containers for magnetic tape cassettes differing from the types described above.

While the invention has been illustrated and described as embodied in a container for storing magnetic tape cassettes, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A storage container for storing magnetic tape cassettes, disc cassettes or the like, comprising a box-shaped hollow body which receives the cassettes to be positioned in a row one next to another with a free space therebetween in an access area; stop means at a front side of said hollow body; means positioned in said hollow body for pushing each cassette individually independently from the remaining cassettes against said stop means, said hollow body having a base; at least one sloping wall inclined to the base of said hollow body, wherein two cassettes adjacent to a cassette to be removed from the container are pressed by a user against said pushing means and slide on said sloping wall towards a rear side of said hollow body thus providing a free access to the cassette to be removed; and lateral guide rails provided in said body and spaced from each other to receive the cassettes so that they lie above one another, said guide rails being parallel to each other and inclined to said base so that each of them forms said sloping wall, said pushing means including a plurality of springs attached to said rear wall and spaced from each other.

2. Storage container as defined in claim 1, wherein said guide rails have at front ends thereof projected edges which form said stop means.

3. Storage container as defined in claim 1, wherein said sloping wall has a width which is equal to a depth of the container reduced by a length of the cassette.

4. Storage container as defined in claim 1, wherein said sloping wall rises towards the rear side of the hollow body.

5. Storage container as defined in claim 1 further including means for positioning cassettes in the container with a free space therebetween.

6. Storage container as defined in claim 1, wherein said positioning means including internally projecting wall means spaced from each other.

7. A storage container for storing magnetic tape cassettes, disc cassettes or the like, comprising a box-shaped hollow body which receives the cassettes to be positioned in a row one next to another within a free space therebetween in an access area; stop means at a front side of said hollow body; means positioned in said hollow body for pushing each cassette individually independently from the remaining cassettes against said stop means, said hollow body having a base; at least one sloping wall inclined to the base of said hollow body, wherein two cassettes adjacent to a cassette to be removed from the container are pressed by a user against said pushing means and slide on said sloping wall towards a rear side of said hollow body thus providing a free access to the cassette to be removed; and lateral guide rails provided in said body and spaced from each other to receive the cassettes so that they lie above one another, said guide rails being parallel to each other and each having a rear portion forming said sloping wall, said pushing means including a plurality of springs attached to said rear wall and spaced from each other.

8. Storage container as defined in claim 7, wherein said guide rails have at front ends thereof projected edges which form said stop means.

9. Storage container as defined in claim 7, wherein said sloping wall has a width which is equal to a depth of the container reduced by a length of the cassette.

* * * * *